(No Model.)
J. B. KENNEDY.
DRAFT APPLIANCE.
No. 570,484. Patented Nov. 3, 1896.
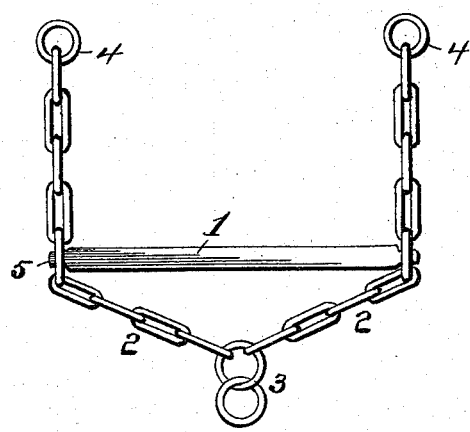
Fig. 1
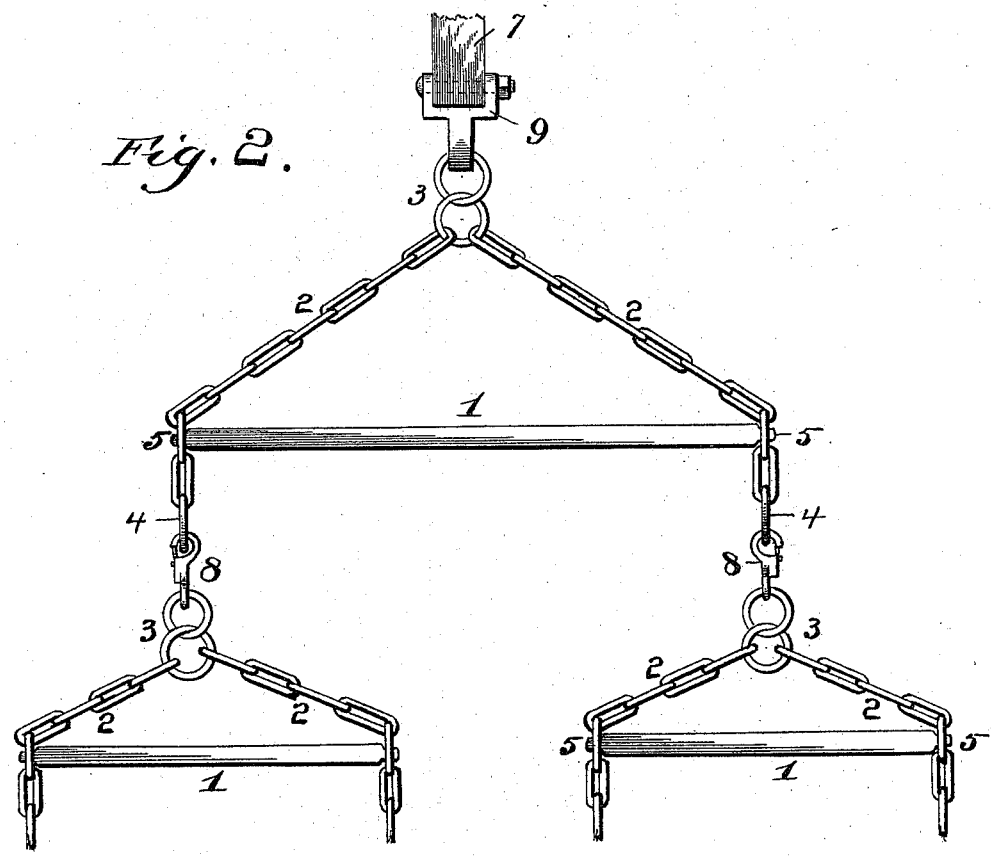
Fig. 2.
Fig. 3
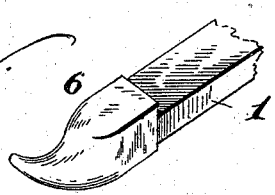
Witnesses:
J. B. McGirr.
J. P. Appleman.
Inventor:
J. B. Kennedy,
By Howson & Howson,
his Attys.

UNITED STATES PATENT OFFICE.

JONATHAN B. KENNEDY, OF COLLINS, GEORGIA.

DRAFT APPLIANCE.

SPECIFICATION forming part of Letters Patent No. 570,484, dated November 3, 1896.

Application filed May 21, 1896. Serial No. 592,428. (No model.)

*To all whom it may concern:*

Be it known that I, JONATHAN B. KENNEDY, a citizen of the United States, residing at Collins, county of Tattnall, State of Georgia, have invented certain new and useful Substitutes for Singletrees, of which the following is a specification.

My invention relates to substitutes for singletrees; and its object is to provide a cheap, effective, and durable substitute for the common singletree, such as that used particularly on plows or other agricultural implements in farm work.

To this end my invention consists in the novel construction and combination of parts hereinafter described with reference to the accompanying drawings, and pointed out in the claim.

In the drawings, Figure 1 is a plan view of my invention. Fig. 2 is a plan view of a modified application thereof. Fig. 3 is a detail of a modification of the spreader-bar.

Referring now particularly to the drawings, in which the same characters designate the same or corresponding parts in all the views, 1 is a spreader-bar, which is preferably made of hard wood and is provided with reduced or tapered ends 5, which ends are adapted to be readily inserted through the links of the chain 2 and loosely retained therein, as shown. This chain is composed of two parts having an equal number of oblong links joined to a central ring 3 of larger diameter than the width of the links and provided at each end with a similar ring 4, to which the traces or other draft appliances are to be attached. The central ring 3, forming the bight of the chain 2, is preferably provided with a second ring 3. By means of these two rings at the center the chain can with equal facility be attached to the old home-made plow-stock, in which the bolt and clevis are so arranged that the bolt passes horizontally through the beam, or to the modern plow-stock, in which the bolt passes vertically through the beam, without distorting the chain from a horizontal plane.

My device as thus described is particularly adapted for use in connection with plows, and its many advantages over the common form of singletree may be thus enumerated: The spreader-bar itself will cost but little, and by experience I find that it will last much longer than the ordinary singletree; and inasmuch as the strain of the draft is largely taken up directly by the chain and only partially distributed through the spreader-bar, the latter will not break under ordinary circumstances, while the use of the simple bar with the tapering ends avoids the annoyance and loss of time so frequently experienced by farmers in the use of the singletree on account of the "friz-irons" thereon frequently working loose and dropping off. Furthermore, any farmer or driver can easily and quickly adjust the device to the kind of plowing or hauling to be done by simply inserting a longer spreader-bar, or shorter, as the conditions require. For example, when the farmer is preparing his land for planting his crop a longer bar can be used, which prevents the traces from rubbing the hind legs of the horses, and while plowing close by the side of the corn, rice, sugar cane, &c., or between rows after the crop has grown up to a considerable height, when it becomes necessary to work the crop a shorter rod may be used, which will prevent the traces from dragging over the stalks or dragging over and bruising the limbs or blades, thereby preventing the crop from being injured. On the other hand, when the common singletrees are used, the farmer is compelled to have in stock longer or shorter ones, complete in all respects, with attachments, to avoid this difficulty, whereas by my invention I use the same chain and merely provide the farmer with a single chain and a set of spreader-bars of different lengths to answer these different necessities.

Again, the longest traces usually supplied are often too short when using horses of more than ordinary size, which objection is entirely overcome by my device, since the chain is made of sufficient length to supply the deficiency in the length of the traces, the ends of the traces being usually provided with snap-hooks, so that if a shorter trace is desired it is only necessary to pass the trace through the link 4, lap, and hook the end to itself the desired distance, thus providing for all sizes of horses.

By using a longer spreader-bar or stretcher, as shown in Fig. 2, two horses may be worked in planting the crop with the same plow, in which case the longer spreader-bar holds the chain far enough apart to attach to each link 4, by means of suitable snap-hooks 8, a second set of chains with corresponding spreader-bars on each side, one ring 3 being shown as attached to the clevis 9 of the plow-beam 7.

In Fig. 3 I have shown the tapered ends of the spreader-bar 1 as arranged with a wear-plate 6, which prevents wear of the tapered ends and adds very little to the cost of the bar. This plate is preferably slightly turned at the end to insure a secure engagement of the ends of the bar with the chain-links.

I claim as my invention—

The herein-described substitute for a common singletree, consisting of the combination with a chain provided with a ring at the center thereof for attachment to a plow-beam, rings in the ends of the chain for attachment with the traces, and a spreader-bar provided with tapered ends having wear-plates secured thereto and slightly curved at the extreme ends, said ends being loosely inserted in the links of the chain, substantially as described.

In testimony whereof I have signed my name to this specification in the presence of two subscribing witnesses.

JONATHAN B. KENNEDY.

Witnesses:
W. B. MURPHY,
J. H. WILLIAMS.